(12) United States Patent
Kwon et al.

(10) Patent No.: US 8,541,506 B2
(45) Date of Patent: Sep. 24, 2013

(54) POLYCARBONATE RESIN COMPOSITION WITH EXCELLENT SCRATCH RESISTANCE AND IMPACT STRENGTH

(75) Inventors: Kee Hae Kwon, Uiwang-si (KR); Jin Hwa Chung, Uiwang-si (KR); Kwang Soo Park, Uiwang-si (KR); Sang Ki Park, Uiwang-si (KR); Il Jin Kim, Uiwang-si (KR)

(73) Assignee: Cheil Industries Inc., Gumi-Si (KR)

( * ) Notice: Subject to any disclaimer, the term of this patent is extended or adjusted under 35 U.S.C. 154(b) by 288 days.

(21) Appl. No.: 12/972,795

(22) Filed: Dec. 20, 2010

(65) Prior Publication Data

US 2011/0160380 A1 Jun. 30, 2011

(30) Foreign Application Priority Data

Dec. 30, 2009 (KR) .................. 10-2009-0134014
Oct. 1, 2010 (KR) .................. 10-2010-0095952

(51) Int. Cl.
*C08L 69/00* (2006.01)

(52) U.S. Cl.
USPC .......................................... 525/133; 525/148

(58) Field of Classification Search
None
See application file for complete search history.

(56) References Cited

U.S. PATENT DOCUMENTS

| | | | |
|---|---|---|---|
| 4,027,073 A | 5/1977 | Clark | |
| 4,045,514 A | 8/1977 | Iwahashi et al. | |
| 4,287,315 A | 9/1981 | Meyer et al. | |
| 4,303,772 A | 12/1981 | Novicky | |
| 4,400,333 A | 8/1983 | Neefe | |
| 4,745,029 A | 5/1988 | Kambour | |
| 4,906,696 A | 3/1990 | Fischer et al. | |
| 5,061,558 A | 10/1991 | Fischer et al. | |
| 5,200,492 A | 4/1993 | Ohnaga et al. | |
| 5,229,443 A | 7/1993 | Wroczynski | |
| 5,280,070 A | 1/1994 | Drzewinski et al. | |
| 5,284,916 A | 2/1994 | Drzewinski | |
| 5,292,809 A | 3/1994 | Drzewinski et al. | |
| 5,449,557 A | 9/1995 | Liebler et al. | |
| 5,451,650 A | 9/1995 | Siol et al. | |
| 5,473,019 A | 12/1995 | Siol et al. | |
| 6,252,002 B1 | 6/2001 | Yamada et al. | |
| 6,646,068 B2 | 11/2003 | Chisholm et al. | |
| 7,067,188 B1 | 6/2006 | Yang et al. | |
| 7,294,659 B2 | 11/2007 | Yatake | |
| 7,732,515 B2 | 6/2010 | Jang et al. | |
| 2002/0042483 A1 | 4/2002 | Vanderbilt | |
| 2006/0004154 A1 | 1/2006 | DeRudder et al. | |
| 2006/0030647 A1 | 2/2006 | Ebeling et al. | |
| 2006/0100307 A1 | 5/2006 | Uerz et al. | |
| 2009/0080079 A1 | 3/2009 | Kogure et al. | |
| 2009/0093583 A1 | 4/2009 | Kawato et al. | |
| 2009/0118402 A1 | 5/2009 | Jang et al. | |
| 2010/0029855 A1 | 2/2010 | Matsuoka et al. | |
| 2010/0152357 A1 | 6/2010 | Kwon et al. | |
| 2010/0168272 A1 | 7/2010 | Park et al. | |
| 2010/0240831 A1 | 9/2010 | Kim et al. | |
| 2010/0256288 A1 | 10/2010 | Kim et al. | |
| 2011/0009524 A1 | 1/2011 | Kwon et al. | |
| 2011/0021677 A1 | 1/2011 | Kwon et al. | |
| 2011/0040019 A1 | 2/2011 | Kwon et al. | |
| 2011/0160380 A1 | 6/2011 | Kwon et al. | |

FOREIGN PATENT DOCUMENTS

| | | |
|---|---|---|
| EP | 0483717 A2 | 5/1992 |
| EP | 1010725 A2 | 6/2000 |
| EP | 2204412 A1 | 7/2010 |
| JP | 04-023856 A | 1/1992 |
| JP | 04-359954 A | 12/1992 |
| JP | 06-313089 A | 11/1994 |
| JP | 2001-049072 A | 2/2001 |
| JP | 2002-080676 | 3/2002 |
| JP | 2005-247999 A | 9/2005 |
| JP | 2006-131833 | 5/2006 |
| JP | 2006-249288 A | 9/2006 |
| JP | 2006-249292 A | 9/2006 |
| JP | 2006-257126 | 9/2006 |
| JP | 2006-257284 A | 9/2006 |
| JP | 2006-342246 A | 12/2006 |
| JP | 2007-023227 A | 2/2007 |
| JP | 2008292853 | * 12/2008 |
| KR | 10-2000-0048033 A | 7/2000 |
| KR | 2004-79118 A | 9/2004 |
| KR | 10-0767428 B1 | 10/2007 |
| KR | 10-902352 | * 6/2009 |
| WO | 2007/004434 A1 | 1/2007 |
| WO | 2007/119920 A1 | 10/2007 |
| WO | 2007/140101 A1 | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A1 | 10/2009 |

OTHER PUBLICATIONS

European Search Report in commonly owned European Application No. 08862371 dated Dec. 7, 2010, pp. 1-6.

(Continued)

*Primary Examiner* — David Buttner
(74) *Attorney, Agent, or Firm* — Summa, Additon & Ashe, P.A.

(57) ABSTRACT

A polycarbonate resin composition according to the present invention comprises a polycarbonate resin and an ultra-high molecular weight branched acrylic copolymer resin and can have excellent transparency, appearance, and flowability, as well as scratch resistance and impact strength.

18 Claims, 4 Drawing Sheets

(56) References Cited

OTHER PUBLICATIONS

International Search Report in commonly owned International Application No. PCT/KR2008/006870, dated May 28, 2009, pp. 1-2.
Office Action in commonly owned U.S. Appl. No. 12/631,018 mailed Nov. 8, 2011, pp. 1-10.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 mailed Dec. 14, 2011, pp. 1-9.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
European Search Report in counterpart European Application No. 10196806 dated Apr. 27, 2011, pp. 1-5.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Office Action in commonly owned U.S. Appl. No. 12/817,302 mailed Mar. 29, 2012, pp. 1-5.
Final Office Action in commonly owned U.S. Appl. No. 12/642,904 mailed Mar. 27, 2012, pp. 1-7.
European Search Report in commonly owned European Application No. 08873425.6 dated May 29, 2012, pp. 1-5.
Office Action in commonly owned U.S. Appl. No. 12/884,549 mailed Aug. 21, 2012, pp. 1-12.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
Final Office Action in commonly owned U.S. Appl. No. 12/631,018 mailed Apr. 26, 2012, pp. 1-12.
Notice of Allowance in commonly owned U.S. Appl. No. 12/642,904 mailed Jul. 2, 2012, pp. 1-8.
Advisory Action in commonly owned U.S. Appl. No. 12/631,018 mailed Nov. 7, 2012, pp. 1-3.
European Search Report in commonly owned European Application No. 08873329.0 dated Dec. 14, 2012, pp. 1-7.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.

* cited by examiner

POLYCARBONATE RESIN COMPOSITION WITH EXCELLENT SCRATCH RESISTANCE AND IMPACT STRENGTH

CROSS-REFERENCE TO RELATED APPLICATIONS

This application claims priority from Korea Patent Application No. 2009-0134014, filed Dec. 30, 2009, in the Korean Intellectual Property Office, and from Korea Patent Application No. 2010-0095952, filed Oct. 1, 2010, in the Korean Intellectual Property Office, the disclosure of each of which is incorporated herein by reference in their entirety.

FIELD OF THE INVENTION

The present invention relates to a polycarbonate resin composition that can have excellent scratch resistance and impact strength.

BACKGROUND OF THE INVENTION

Thermoplastic resins have a lower specific gravity than glass or metal and excellent properties such as moldability and impact resistance. Plastic resins have been widely used in various products such as automobiles and electrical/electronic appliances as a substitute for glass or metal to lower costs, scale up production, reduce weight, and the like. For this reason, the function and appearance of thermoplastic resins used in housings are increasingly important, and scratch resistance is also increasingly required.

Polycarbonate (PC) resin can have excellent impact resistance, thermal stability, self-extinguishing properties and dimensional stability as well as excellent mechanical strength and flame resistance. Therefore polycarbonate resin is used to manufacture various products such as automobiles and electrical/electronic appliances, among others. Moreover, glass in products that require both impact resistance and transparency such as lens can be substituted with polycarbonate resin. However, polycarbonate has low scratch resistance.

Acrylic resins, especially polymethyl methacrylate (PMMA) resin, can have excellent transparency, weather resistance, mechanic strength, surface gloss, adhesion, and scratch resistance. Acrylic resins, however, can have poor impact resistance and flame resistance.

One method to improve scratch resistance of a resin surface includes hardening an inorganic or organic hybrid material on the surface of a final molded resin using heat or ultraviolet light. However, this method can increase costs, cause pollution problems and increase processing times because of the additional coating step. Accordingly, there is increasingly a need for a non-coated resin exhibiting scratch resistance. Moreover, development of a resin with excellent scratch resistance is very important for the housing industry.

One method for preparing a resin having scratch resistance that also addresses the above problems is preparing a PC/PMMA resin by mixing polycarbonate and acrylic resin, preferably polymethyl methacrylate (PMMA). However, the PC/PMMA alloy has poor transparency and colorability due to the refractive index difference and the poor compatibility between PC and PMMA. Moreover, the impact strength of the PC/PMMA alloy can significantly deteriorate due to the poor impact strength of the acrylic resin, and accordingly the PC/PMMA alloy cannot be used in products requiring high impact strength.

SUMMARY OF THE INVENTION

The present invention provides a polycarbonate resin composition that can have excellent impact strength, scratch resistance, flowability, moldability, transparency, and appearance. The polycarbonate resin composition of the invention comprises a polycarbonate resin and a high molecular weight branched acrylic copolymer resin. The high molecular weight branched acrylic copolymer resin can impart excellent flowability and moldability to the composition. The high molecular weight branched acrylic copolymer resin can also have a higher refractive index than many other acrylic resins, which can help minimize phase separation between the polycarbonate resin and the high molecular weight branched acrylic copolymer resin, improve compatibility therebetween, and provide excellent transparency and appearance to the polycarbonate resin composition. In addition, the polycarbonate resin composition of the invention can have excellent scratch resistance. Accordingly, the polycarbonate resin composition of the invention can be useful in the production of various products such as electrical and/or electronic parts, automobile parts, lens, windows, and the like.

The present invention further provides molded articles prepared from the polycarbonate resin composition.

The polycarbonate resin composition according to the present invention can comprise (A) about 50 to about 99 parts by weight of a polycarbonate resin and (B) about 1 to about 50 parts by weight of an ultra-high molecular weight branched acrylic copolymer resin, wherein (B) the ultra-high molecular weight branched acrylic copolymer resin can comprise a (meth)acrylic monomer having a flexible segment.

In exemplary embodiments of the present invention, the polycarbonate resin composition further comprises (C) 0 to 50 parts by weight of a linear acrylic resin.

In exemplary embodiments of the present invention, (B) the ultra-high molecular weight branched acrylic copolymer resin may include a polymers or a combination of polymers prepared by polymerizing a monomer mixture comprising (b1) an aromatic methacrylate monomer, alicyclic methacrylate monomer, or a combination thereof, (b2) a functional acrylic monomer copolymerizable with the aromatic methacrylate monomer, the alicyclic methacrylate monomer, or the combination thereof, (b3) a (meth)acrylic monomer having a flexible segment, and (b4) a monomer forming a branched structure.

In exemplary embodiments of the present invention, (B) the ultra-high molecular weight branched acrylic copolymer resin (B) may include one or more polymers prepared by polymerizing a monomer mixture comprising (b1) about 5 to about 99.8% by weight of an aromatic methacrylate monomer, an alicyclic methacrylate monomer, or a combination thereof, (b2) about 0 to about 94.5% by weight of a functional acrylic monomer copolymerizable with the aromatic methacrylate monomer, the alicyclic methacrylate monomer, or the combination thereof, (b3) about 0.1 to about 40% by weight of a (meth)acrylic monomer having a flexible segment, and (b4) about 0.001 to about 10% by weight of a monomer forming a branched structure.

In exemplary embodiments of the present invention, (B) the ultra-high molecular weight branched acrylic copolymer resin can have a weight average molecular weight of about 100,000 to about 5,000,000.

In exemplary embodiments of the present invention, (B) the ultra-high molecular weight branched acrylic copolymer resin can have refractive index of about 1.495 to about 1.570.

In exemplary embodiments of the present invention, (B) the ultra-high molecular weight branched acrylic copolymer resin may be prepared by emulsion polymerization or suspension polymerization.

In exemplary embodiments of the present invention, (b1) the aromatic methacrylate monomer and/or the alicyclic methacrylate monomer may be used alone, or in combination with (b2) the functional acrylic monomer copolymerizable with the aromatic methacrylate monomer and/or the alicyclic methacrylate monomer, wherein the refractive indices of both (b1) the aromatic methacrylate monomer and/or the alicyclic methacrylate monomer and the mixture of (b1) the aromatic methacrylate monomer and/or the alicyclic methacrylate monomer and (b2) the functional acrylic monomer are about 1.495 to about 1.570.

In exemplary embodiments of the present invention, (b3) the (meth)acrylic monomer having a flexible segment may include without limitation tert-butyl (meth)acrylate, 2-ethylhexyl (meth)acrylate, a compound represented by the following Chemical Formula 1, or a combination thereof:

[Chemical Formula 1]

wherein m is an integer from 3 to 18, X is hydrocarbon and Y is methyl or hydrogen.

In exemplary embodiments of the present invention, (b3) examples of the (meth)acrylic monomer having a flexible segment may include without limitation butyl (meth)acrylate, tert-butyl (meth)acrylate, 2-ethylhexyl (meth)acrylate, hexyl (meth)acrylate, stearyl (meth)acrylate, lauryl (meth)acrylate, and combinations thereof.

In exemplary embodiments of the present invention, (C) the linear acrylic resin can have a weight average molecular weight of about 5,000 to about 300,000.

In exemplary embodiments of the present invention, the polycarbonate resin composition can have a complex viscosity ($\eta^*$) of about 10,000 to about 1,000,000 Pas at 240° C. under the frequency of 0.01 rad/s, and a ratio of $\eta^*$ (0.01 rad/s)/$\eta^*$ (100 rad/s) within the range of about 2.0 to about 10.0 at 240° C.

The present invention further provides a molded article prepared from the polycarbonate resin composition.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A polycarbonate resin composition according to the present invention can comprise (A) about 50 to about 99 parts by weight of a polycarbonate resin and (B) about 1 to about 50 parts by weight of an ultra-high molecular weight branched acrylic copolymer resin, wherein (B) the ultra-high molecular weight branched acrylic copolymer resin can comprise a (meth)acrylic monomer having a flexible segment.

In exemplary embodiments of the present invention, the polycarbonate resin composition further comprises (C) about 0 to about 50 parts by weight of a linear acrylic resin.

In exemplary embodiments of the present invention, (B) the ultra-high molecular weight branched acrylic copolymer resin may include a polymer or a combination of polymers prepared by polymerizing a monomer mixture comprising (b1) an aromatic methacrylate monomer, an alicyclic methacrylate monomer, or a combination thereof, (b2) a functional acrylic monomer copolymerizable with the aromatic methacrylate monomer, the alicyclic methacrylate monomer, or the combination thereof, (b3) a (meth)acrylic monomer having a flexible segment, and (b4) a monomer forming a branched structure.

In exemplary embodiments of the present invention, (b3) the (meth)acrylic monomers having a flexible segment may include tert-butyl (meth)acrylate, 2-ethylhexyl (meth)acrylate, a compound represented by the following Chemical Formula 1, or a combination thereof:

[Chemical Formula 1]

wherein m is an integer from 3 to 18, X is hydrocarbon and Y is methyl or hydrogen.

As used herein, unless otherwise defined, the term "hydrocarbon" includes substituted or unsubstituted C1-C30 alkyl, substituted or unsubstituted C5-C30 cycloalkyl, or substituted or unsubstituted C5-C30 aryl. Also as used herein, unless otherwise defined, the term "substituted" refers to a group in which a hydrogen substituent is substituted with a halogen (F, Cl, Br, I), a hydroxy group, a nitro group, cyano group, an amino group, a carboxyl group, a C1 to C20 alkyl group, a C2 to C20 alkenyl group, a C2 to C20 alkynyl group, a C1 to C20 alkoxy group, a C6 to C30 aryl group, a C6 to C30 aryloxy group, a C3 to C30 cycloalkyl group, a C3 to C30 cycloalkenyl group, a C3 to C30 cycloalkynyl group, or a combination thereof.

In exemplary embodiments of the present invention, (B) the ultra-high molecular weight branched acrylic copolymer resin may include a polymer or a combination of polymers prepared by polymerizing a monomer mixture comprising (b1) about 5 to about 99.8% by weight of an aromatic methacrylate monomer, an alicyclic methacrylate monomer, or a combination thereof, (b2) about 0 to about 94.5% by weight of a functional acrylic monomer copolymerizable with the aromatic methacrylate monomer, the alicyclic methacrylate monomer, or the combination thereof, (b3) about 0.1 to about 40% by weight of a (meth)acrylic monomer having a flexible segment, and (b4) about 0.001 to about 10% by weight of a monomer forming a branched structure.

(A) Polycarbonate Resin

In an exemplary embodiment of the present invention, the polycarbonate resin can be prepared by reacting phosgene with a dihydric phenol compound in the presence of a catalyst and a molecular weight control agent according to known methods. In another exemplary embodiment of the present invention, the polycarbonate resin can be prepared by transesterification of a dihydric phenol compound and a carbonate precursor such as diphenyl carbonate.

A bisphenol compound may be used as the dihydric phenol compound, for example, 2,2-bis(4-hydroxyphenyl)propane (bisphenol A). The bisphenol A can be partially or totally substituted by another dihydric phenol compound. Examples of other kinds of dihydric phenol compounds may include without limitation halogenated bisphenol, hydroquinone, 4,4'-hydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, 2,2-bis(3,5-dibromo-4-hydroxyphenyl)propane and the like, and combinations thereof. The kinds of dihydric phenol compounds used to prepare the polycarbonate resin, however, are not limited to the foregoing and any suitable dihydric phenol compound may be used.

The polycarbonate resin may be a homopolymer prepared using one kind of dihydric phenol compound, a copolymer prepared using two or more kinds of dihydric phenol compounds, or a combination thereof.

The polycarbonate resin may also be a linear polycarbonate resin, a branched polycarbonate resin, a polyester-carbonate copolymer resin, or a combination thereof.

The linear polycarbonate resin may be prepared using bisphenol A. The branched polycarbonate resin may be prepared by reacting a multifunctional aromatic compound such as trimellitic anhydride or trimellitic acid with a carbonate precursor. The polyester-carbonate copolymer resin may be prepared by reacting a difunctional carboxylic acid with a dihydric phenol compound and carbonate precursor.

In the present invention, the polycarbonate resin may be used alone or as a combination thereof, including combinations of polycarbonate resins having different molecular weights.

In the present invention, the polycarbonate resin composition may include the polycarbonate resin (A) in an amount of about 50 to about 99 parts by weight, based on the total weight of components (A) and (B). In exemplary embodiments of the invention, the polycarbonate resin composition can include the polycarbonate resin (A) in an amount of about 60 to about 90 parts by weight to provide the polycarbonate resin composition with excellent scratch resistance and mechanical properties.

In some embodiments, the polycarbonate resin composition may include the polycarbonate resin (A) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 parts by weight. Further, according to some embodiments of the present invention, the amount of the polycarbonate resin (A) can be in a range from about any of the foregoing amounts to about any other of the foregoing amounts.

If the polycarbonate resin is used in amount of less than about 50 parts by weight, it may be difficult to provide the excellent mechanical properties of the polycarbonate.

(B) Ultra-High Molecular Weight Branched Acrylic Copolymer Resin

In the present invention, (B) the ultra-high molecular weight branched acrylic copolymer resin may include a polymer or a combination of polymers prepared by polymerizing a monomer mixture comprising (b1) an aromatic methacrylate monomer, an alicyclic methacrylate monomer, or a combination thereof, (b2) a functional acrylic monomer copolymerizable with the aromatic methacrylate monomer, the alicyclic methacrylate monomer, or the combination thereof, (b3) a (meth)acrylic monomer having a flexible segment, and (b4) a monomer forming a branched structure.

In exemplary embodiments of the present invention, (B) the ultra-high molecular weight branched acrylic copolymer resin may be a polymer or a combinations of polymers including (b1) about 5 to about 99.8% by weight of the aromatic methacrylate monomer, the alicyclic methacrylate monomer, or a combination thereof, (b2) about 0 to about 94.5% by weight of the functional acrylic monomer copolymerizable with the aromatic methacrylate monomer, the alicyclic methacrylate monomer, or the combination thereof, (b3) about 0.1 to about 40% by weight of the (meth)acrylic monomer having a flexible segment, and (b4) about 0.001 to about 10% by weight of the monomer forming a branched structure, each based on 100% by weight of (B) the ultra-high molecular weight branched acrylic copolymer resin.

In some embodiments, (b1) the aromatic and/or alicyclic methacrylate monomer may be used in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, or 99.8% by weight. Further, according to some embodiments of the present invention, the amount of (b1) the aromatic and/or alicyclic methacrylate monomer can be in a range from about any of the foregoing amounts to about any other of the foregoing amounts.

In some embodiments, (B) the ultra-high molecular weight branched acrylic copolymer resin may not include (b2) the functional acrylic monomer copolymerizable with the aromatic and/or alicyclic methacrylate monomer (i.e., (B) the ultra-high molecular weight branched acrylic copolymer resin may include 0% by weight of (b2) the functional acrylic monomer copolymerizable with the aromatic and/or alicyclic methacrylate monomer). In some embodiments, (b2) the functional acrylic monomer copolymerizable with the aromatic and/or alicyclic methacrylate monomer may be present in (B) the ultra-high molecular weight branched acrylic copolymer resin, i.e., (B) the ultra-high molecular weight branched acrylic copolymer resin may include (b2) the functional acrylic monomer copolymerizable with the aromatic and/or alicyclic methacrylate monomer in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 94.1, 94.2, 94.3, 94.4, or 94.5% by weight. Further, according to some embodiments of the present invention, the amount of (b2) the functional acrylic monomer copolymerizable with the aromatic and/or alicyclic methacrylate monomer can be in a range from about any of the foregoing amounts to about any other of the foregoing amounts.

In exemplary embodiments of the present invention, (b3) the (meth)acrylic monomer having a flexible segment may be used in an amount of about 0.1 to about 40% by weight, for example about 0.5 to about 30% by weight, and as another example about 1 to about 20% by weight, based on 100% by weight of (B) the ultra-high molecular weight branched acrylic copolymer resin. In some embodiments, (b3) the (meth)acrylic monomer having a flexible segment may be used in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of (b3) the (meth)acrylic monomer having a flexible segment can be in a range from about any of the foregoing amounts to about any other of the foregoing amounts.

If the (meth)acrylic monomer having a flexible segment is used in an amount of less than about 0.1% by weight, the flexible structure may not be well-formed, and accordingly impact strength may not be sufficiently improved. If the (meth)acrylic monomer having a flexible segment is used in an amount of more than about 40% by weight, properties of the acrylic resin may be deteriorated.

In exemplary embodiments, (b4) the monomer forming a branched structure may be used in an amount of about 0.001 to about 10%, for example, about 0.01 to about 7% by weight, and as another example about 0.1 to about 5% by weigh. In some embodiments, (b4) the monomer forming a branched structure may be used in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10% by weight. Further, according to some embodiments of the present invention, the amount of the (b4) monomer forming a branched structure can be in a range from about any of the foregoing amounts to about any other of the foregoing amounts.

If (b4) the monomer forming a branched structure is used in an amount of less than about 0.001% by weight, the branched structure may not be sufficiently formed. If (b4) the monomer forming a branched structure is used in an amount of more than about 10% by weight, problems may occur when processing due to an increased viscosity.

In exemplary embodiments of the present invention, (B) the ultra-high molecular weight branched acrylic copolymer resin may be prepared by copolymerizing phenyl methacrylate, methyl methacrylate, butyl methacrylate and divinyl tetramethyl disiloxane.

In the present invention, the polycarbonate resin composition may include (B) the ultra-high molecular weight branched acrylic copolymer resin in an amount of about 1 to about 50 parts by weight, for example about 5 to about 50 parts by weight, and as another example about 10 to about 50 parts by weight, based on the total weight of components (A) and (B).

In some embodiments, the polycarbonate resin composition may include the ultra-high molecular weight branched acrylic copolymer resin (B) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the ultra-high molecular weight branched acrylic copolymer resin (B) can be in a range from about any of the foregoing amounts to about any other of the foregoing amounts.

If (B) the ultra-high molecular weight branched acrylic copolymer resin is used in an amount of less than about 1 part by weight, impact strength may not be sufficiently improved, and if (B) the ultra-high molecular weight branched acrylic copolymer resin is used in an amount of more than about 50 parts by weight, impact strength of the polycarbonate resin itself may be deteriorated, and thereby excellent impact strength property may not be achieved.

In exemplary embodiments of the present invention, (B) the ultra-high molecular weight branched acrylic copolymer resin (B) can have a weight average molecular weight of about 100,000 to about 5,000,000.

In exemplary embodiments of the present invention, (B) the ultra-high molecular weight branched acrylic copolymer resin can have a refractive index of about 1.495 to about 1.570.

In the present invention, (B) the ultra-high molecular weight branched acrylic copolymer resin may be prepared by known methods such as bulk polymerization, emulsion polymerization and suspension polymerization, and may be easily prepared by a person with ordinary skill in the art.

In exemplary embodiments of the present invention, (b1) the aromatic methacrylate monomer(s) and/or alicyclic methacrylate monomer(s) may be used alone, or in combination with one another and/or in combination with (b2) a functional acrylic monomers copolymerizable with the aromatic and/or alicyclic methacrylate monomers, wherein the refractive indices of both (b1) the aromatic methacrylate monomer and/or the alicyclic methacrylate monomer and the mixture of (b1) the aromatic methacrylate monomer and/or the alicyclic methacrylate monomer and (b2) the functional acrylic monomer are about 1.495 to about 1.570.

The aromatic and/or alicyclic methacrylate monomers (b1) may be represented by the following Chemical Formula 2, Chemical Formula 3, or a combination thereof:

[Chemical Formula 2]

wherein m is an integer from 0 to 10 and X is cyclohexyl, phenyl, methylphenyl, methylethylphenyl, methoxyphenyl, cyclohexylphenyl, chlorophenyl, bromophenyl, phenylphenyl or benzylphenyl.

[Chemical Formula 3]

wherein m is an integer from 0 to 10, Y is oxygen (O) or sulfur (S), and Ar is cyclohexyl, phenyl, methylphenyl, methylethylphenyl, methoxyphenyl, cyclohexylphenyl, chlorophenyl, bromophenyl, phenylphenyl or benzylphenyl.

Examples of (b1) the aromatic and/or alicyclic methacrylate monomers may include without limitation cyclohexyl methacrylate, phenoxy methacrylate, phenoxy ethyl methacrylate, 2-ethylphenoxy methacrylate, 2-ethylthiophenyl methacrylate, 2-ethylaminophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, and the like, and combinations thereof.

Examples of (b2) the functional acrylic monomer copolymerizable with the aromatic and/or alicyclic methacrylate monomers may include without limitation methyl methacrylate, ethyl methacrylate, propyl methacrylate, methyl acrylate, ethyl acrylate, propyl acrylate, 2-ethylhexyl acrylate, 2-hydroxyethyl acrylate, 2-hydroxypropyl acrylate, monoglycerol acrylate, acrylic acid, methacrylic acid, maleic anhydride, and the like, and combinations thereof.

As used herein, the term "(meth)acrylic monomer having a flexible segment" refers to a methacrylic acid alkyl ester or acrylic acid alkyl ester in which the alkyl group is a long chain alkyl including a sufficient number of carbon atoms to impart flexibility to the monomer structure, for example, a straight chain or branched C3 to C30 alkyl.

In exemplary embodiments of the present invention, (b3) the (meth)acrylic monomer having a flexible segment may include tert-butyl (meth)acrylate, 2-ethylhexyl (meth)acrylate, a compound represented by the following Chemical Formula 1, or a combination thereof:

[Chemical Formula 1]

wherein m is an integer from 3 to 18, X is hydrocarbon and Y is methyl or hydrogen.

When an acrylic resin is added to a polycarbonate resin with good impact strength to improve scratch resistance of the polycarbonate resin, the impact strength provided by the polycarbonate resin itself may be highly deteriorated, because the acrylic resin itself is very brittle. However, when the (meth)acrylic monomer having a flexible segment according to the present invention is used, the molecular weight itself may become very large due to the flexible segment, and further the impact strength of the resin composition may be excellent because the flexible segment can provide a soft structure.

In exemplary embodiments of the present invention, (b3) the (meth)acrylic monomer having a flexible segment may be represented by the following Chemical Formula 4:

[Chemical Formula 4]

wherein m is an integer from 3 to 9, X is hydrocarbon and Y is methyl or hydrogen.

In another exemplary embodiment of the present invention, (b3) the (meth)acrylic monomer having a flexible segment may be represented by the following Chemical Formula 5:

[Chemical Formula 5]

wherein m is an integer from 10 to 18, X is hydrocarbon, and Y is methyl or hydrogen.

In another exemplary embodiment of the present invention, (b3) the (meth)acrylic monomer having a flexible segment may comprise compounds represented by both Chemical Formula 4 and by Chemical Formula 5.

In exemplary embodiments of the present invention, (b3) the (meth)acrylic monomer having a flexible segment may include butyl (meth)acrylate, tert-butyl (meth)acrylate, 2-ethylhexyl (meth)acrylate, hexyl (meth)acrylate, stearyl (meth) acrylate, lauryl (meth)acrylate, or a combination thereof. In exemplary embodiments of the invention, (b3) the (meth)acrylic monomer having a flexible segment may be butyl (meth)acrylate.

In the present invention, (b4) the monomers forming a branched structure may have two or more polymerizable unsaturated groups, which are capable of radical polymerization, and the (b4) monomers may be used alone or a combination thereof. The number of functional groups of the monomers forming a branched structure may be from 2 to 8, and accordingly the ultra-high molecular weight branched acrylic copolymer resin can be prepared with the help of the monomers forming a branched structure.

Examples of (b4) the monomers forming a branched structure may include without limitation silane or siloxane compounds, allyl compounds, (meth)acrylic monomers, aromatic monomers, vinyl group-containing monomers, and the like, and combinations thereof.

Specifically, examples of (b4) the monomers forming a branched structure may include without limitation silane or siloxane compounds including unsaturated hydrocarbon group-containing silicone-containing monomers such as divinyl tetramethyl disiloxane and tetramethyl tetravinyl cyclotetrasiloxane; allyl compounds including diallyl phthalate, diallylacrylamide, triallyl (iso)cyanurate, and triallyl trimelitate; (poly)alkylene glycol di(meth)acrylate compounds including 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, and glycerol tri(meth)acrylate; aromatic monomers including divinylbenzene; vinyl group-containing monomers including 1,4-divinyloxybutane and divinylsulfone; and the like. They may be used alone or in combination with one another.

(C) Linear Acrylic Resin

In the present invention, the polycarbonate resin composition may further comprise (C) a linear acrylic resin. The linear acrylic resin may be a polymer of one or more (meth)acrylic monomers, copolymer thereof, or a mixture of the polymer and the copolymer.

In the present invention, (C) the linear acrylic resin has a linear structure, may have a weight average molecular weight of about 5,000 to about 300,000, and may have a refractive index of about 1.490 to about 1.570.

Examples of the (meth)acrylic monomers may include without limitation methyl methacrylate, ethyl methacrylate, n-propyl methacrylate, n-butyl methacrylate, phenyl methacrylate, benzyl methacryate, hexyl methacrylate, cyclohexyl methacrylate, phenoxy methacrylate, phenoxyethyl methacrylate, methyl acrylate, ethyl acrylate, propyl acrylate, butyl acrylate, 2-ethylhexyl acrylate, 2-ethylhexyl methacrylate, and the like. The (meth)acrylic monomers can be used alone or in combination with one another.

The linear acrylic resin (C) may be a homopolymer prepared using one kind of (meth)acrylic monomer, a copolymer prepared using two or more kinds of (meth)acrylic monomers, or a combination thereof.

The linear acrylic resin (C) can be prepared by known methods such as emulsion polymerization, suspension polymerization or bulk polymerization, and may be easily prepared by a person with ordinary skill in the art.

In exemplary embodiments of the present invention, the polycarbonate resin composition can include (C) the linear acrylic resin in an amount of about 0 to about 50 parts by weight, based on total weight of components (A) and (B). In some embodiments, the polycarbonate resin composition may not include the linear acrylic resin (C) (i.e., the polycarbonate resin composition may include 0% by weight of the linear acrylic resin (C)). In some embodiments, the linear acrylic resin (C) may be present in the polycarbonate resin composition, i.e., the polycarbonate resin composition may include the linear acrylic resin (C) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the linear acrylic resin (C) can be in a range from about any of the foregoing amounts to about any other of the foregoing amounts.

(D) Impact Modifier

In the present invention, the polycarbonate resin composition may further comprise (D) an impact modifier.

Examples of (D) the impact modifier may include graft copolymers, olefin copolymers, and the like, and combinations thereof.

The graft copolymer may be prepared by polymerizing one or more rubber monomers such as but not limited to diene rubbers, acrylic rubbers, silicone rubbers, and the like, and combinations thereof, to form a rubber polymer, and graft polymerizing one or more graft-copolymerizable monomers such as but not limited to styrene, α-methyl styrene, C1-C4 alkyl-substituted styrene, acrylonitrile, methacrylonitrile, methyl methacrylate, maleic anhydride, C1-C4 alkyl-substituted maleimide, phenyl-substituted maleimide, and the like, and combinations thereof to the rubber polymer.

In exemplary embodiments of the present invention, the rubber polymer may be used in an amount of about 20 to about 80 parts by weight, based on the total weight of the impact modifier.

Examples of the diene rubber may include without limitation butadiene, isoprene, and the like, and combinations thereof. Examples of the acrylic rubber may include without limitation methyl acrylate, ethyl acrylate, n-propyl acrylate, n-butyl acrylate, 2-ethylhexyl acrylate, hexyl methacrylate, 2-ethylhexyl methacrylate, and the like, and combinations thereof. Examples of the silicone rubber may include without limitation cyclosiloxanes such as hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations thereof. Further, olefin rubbers such as ethylene/propylene rubber, ethylene-propylene-diene monomer (EPDM) rubber, and the like, and combinations thereof may be used as the rubber polymer.

In exemplary embodiments of the present invention, (D) the impact modifier may be used in amount of about 0 to about 30 parts by weight, based on 100 parts by weight of a base resin comprising (A), (B) and (C). In some embodiments, the polycarbonate resin composition may not include the impact modifier (D) (i.e., the polycarbonate resin composition may include 0% by weight of the impact modifier (D)). In some embodiments, the impact modifier (D) may be present in the polycarbonate resin composition, i.e., the polycarbonate resin composition may include the impact modifier (D) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the impact modifier (D) can be in a range from about any of the foregoing amounts to about any other of the foregoing amounts.

In the present invention, (B) the ultra-high molecular weight branched acrylic copolymer resin can improve the impact strength of the polycarbonate resin composition due to its branched structure and ultra-high molecular weight. Also the compatibility between (A) the polycarbonate resin and (B) the ultra-high molecular weight branched acrylic copolymer resin may be improved due to the reduced refractive index difference therebetween because of the increased refractive index of (B) the ultra-high molecular weight branched acrylic copolymer resin and the decreased viscosity resulting from the branched structure. Accordingly, the coloring property and the transparency of the polycarbonate resin composition may be improved. Also, the impact strength and the flowability of the polycarbonate resin composition may be improved due to the ultra-high molecular weight branched acrylic copolymer resin and the decreased viscosity.

In exemplary embodiments of the present invention, the polycarbonate resin composition can have complex viscosity ($\eta^*$) of about 10,000 to about 1,000,000 Pas at 240° C. under the frequency of 0.01 rad/s, and a ratio of $\eta^*$ (0.01 rad/s)/$\eta^*$ (100 rad/s) within the range of about 2.0 to about 10.0 at 240° C.

In exemplary embodiments of the present invention, the polycarbonate resin composition may further comprise one or more additives such as antibacterial agents, mold release agents, heat stabilizers, antioxidants, light stabilizers, compatibilizers, dyes, inorganic additives, surfactants, nucleating agents, coupling agents, fillers, plasticizers, reinforcers, admixing agents, coloring agents, stabilizers, lubricants, antistatic agents, pigments, flame retardants, and the like, and combinations thereof. One of ordinary skill in the art can readily select suitable additives based on the desired properties of the composition. The additive(s) can be used in conventional amounts.

The polycarbonate resin composition can be prepared by known methods. For example, the polycarbonate resin composition of the present invention may be prepared by mixing the aforementioned components with optional additives and melt-extruding the composition in an extruder. The composition can be prepared in the form of pellets or chips or alternatively can be directly molded into the desired product. The prepared pellets may be used in the preparation of injection molded and extrusion molded products.

In another aspect of the present invention, there is provided a molded article obtained by molding the aforementioned polycarbonate resin composition. The molded article may be used in articles requiring scratch resistance, impact strength, coloring property and transparency.

As non-limiting examples, the molded article may be used in a wide range of products such as but not limited to exterior materials or parts for electric/electronic products, parts for automobiles, lens, window, and the like.

In exemplary embodiments of the present invention, the molded article may be used in housings for electric/electronic products such as televisions, audio players, washing machines, cassette players, mp3 players, telephones, game players, video players, computers, photocopiers, and the like, and interior/exterior materials for cars such as dashboards, instrument panels, door panels, quarter panels, wheel covers, and the like.

Methods for preparing the molded articles using the resin compositions of the present invention are not limited and can include as non-limiting examples extrusion, injection molding or casting. Such methods are known in the art and be readily conducted by those skilled in the art.

The invention may be better understood by reference to the following examples which are intended for the purpose of illustration and are not to be construed as in any way limiting the scope of the present invention, which is defined in the claims appended hereto.

EXAMPLES

The components used in the Examples and Comparative Examples will be described more fully hereinafter.

(A) Polycarbonate Resin

Bisphenol-A based linear polycarbonate having a weight average molecular weight of 25,000 g/mol made by Teijin Chemicals Ltd. of Japan (product name: PANLITE L-1250 WP) is used.

Ultra-High Molecular Weight Branched Acrylic Copolymer Resin (B-1) A branched acrylic copolymer resin having a refractive index of 1.530 and a weight average molecular weight of 200,000 g/mol is prepared by a conventional suspension polymerization using 50% by weight of phenyl methacrylate, 36.5% by weight of methyl methacrylate, 2.5% by weight of methyl acrylate, 10% by weight of butyl methacrylate and 1% by weight of divinyltetramethyldisiloxane.

(B-2) A branched acrylic copolymer resin having a refractive index of 1.530 and a weight average molecular weight of 200,000 g/mol is prepared by a conventional suspension polymerization using 50% by weight of phenyl methacrylate, 41.5% by weight of methyl methacrylate, 2.5% by weight of methyl acrylate, 5% by weight of butyl methacrylate and 1% by weight of divinyltetramethyldisiloxane.

(B-3) A branched acrylic copolymer resin having a refractive index of 1.510 and a weight average molecular weight of 200,000 g/mol is prepared by a conventional suspension polymerization using 30% by weight of phenyl methacrylate, 56.5% by weight of methyl methacrylate, 2.5% by weight of methyl acrylate, 10% by weight of butyl methacrylate and 1% by weight of divinyltetramethyldisiloxane.

(B-4) A branched acrylic copolymer resin having a refractive index of 1.530 and a weight average molecular weight of 150,000 g/mol is prepared by a conventional suspension polymerization using 50% by weight of phenyl methacrylate, 37% by weight of methyl methacrylate, 2.5% by weight of methyl acrylate, 10% by weight of butyl methacrylate and 0.5% by weight of divinyltetramethyldisiloxane.

(B-5) A branched acrylic copolymer resin having a refractive index of 1.530 and a weight average molecular weight of 200,000 g/mol is prepared by a conventional suspension polymerization using 50% by weight of phenyl methacrylate, 36.5% by weight of methyl methacrylate, 2.5% by weight of methyl acrylate, 10% by weight of stearyl methacrylate and 1% by weight of divinyltetramethyldisiloxane.

(B-6) A branched acrylic copolymer resin having a refractive index of 1.530 and a weight average molecular weight of 200,000 g/mol is prepared by a conventional suspension polymerization using 50% by weight of phenyl methacrylate, 36.5% by weight of methyl methacrylate, 2.5% by weight of methyl acrylate, 5% by weight of butyl methacrylate, 5% by weight of stearyl methacrylate and 1% by weight of divinyltetramethyldisiloxane.

Ultra-High Molecular Weight Branched Acrylic Copolymer Resin without a Flexible Structure (B-7) A branched acrylic copolymer resin having a refractive index of 1.530 and a weight average molecular weight of 200,000 g/mol is prepared by a conventional suspension polymerization using 50% by weight of phenyl methacrylate, 46.5% by weight of methyl methacrylate, 2.5% by weight of methyl acrylate and 1% by weight of divinyltetramethyldisiloxane.

Ultra-High Molecular Weight Branched Acrylic Copolymer Resin with a Low Refractive Index (B-8) A branched acrylic copolymer resin having a refractive index of 1.487 and a weight average molecular weight of 200,000 g/mol is prepared by a conventional suspension polymerization using 86.5% by weight of methyl methacrylate, 2.5% by weight of methyl acrylate, 10% by weight of butyl methacrylate and 1% by weight of divinyltetramethyldisiloxane.

(C) Linear Acrylic Resin (C-1) A linear acrylic copolymer having a refractive index of 1.530 and a weight average molecular weight of 80,000 g/mol is prepared by a conventional suspension polymerization using 50% by weight of phenyl methacrylate, 47.5% by weight of methyl methacrylate and 2.5% by weight of methyl acrylate.

(C-2) A linear acrylic copolymer having a refractive index of 1.490 and a weight average molecular weight of 80,000 g/mol is prepared by a conventional suspension polymerization using 97.5% by weight of methyl methacrylate and 2.5% by weight of methyl acrylate.

(D) Impact Modifier

A methyl methacrylate-Butadiene-Styrene (MBS) copolymer, which is prepared by graft-polymerizing butadiene rubber with methyl methacrylate and styrene, made by MRC company (product name: Metablen C223-A Grade) is used.

Examples 1-7 and Comparative Examples 1-6

The components as shown in the following Table 1 are added to a conventional mixer and the mixture is melt mixed and extruded through a twin screw extruder (L/D=29, Φ=45 mm) to prepare pellets. After drying the produced pellets at 80° C. for 6 hours, test specimens having a size of L 90 mm×W 50 mm×t 2.5 mm are prepared by injecting the dried pellets using a 6-Oz injector. The methods used for measuring each of the properties are as follows, and the measured results are shown in Table 1.

(1) Compatibility: The existence and nonexistence of a flow mark on the surface as determined by the naked eye, and the flow mark is classified as the follows.

○: existence, x: nonexistence

Figure 2A:
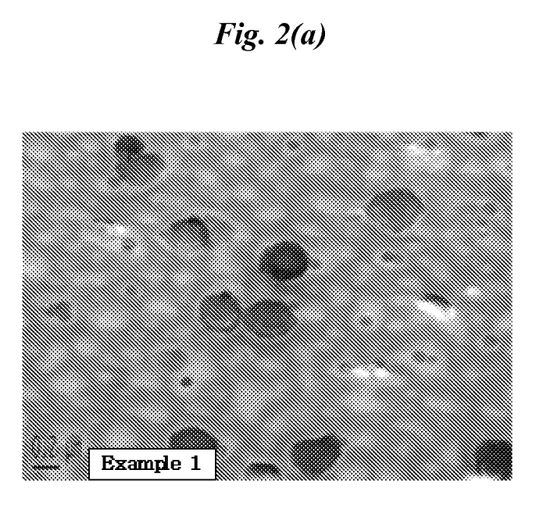
FIG. 2a is a TEM image representing phase behavior of example 1.
Figure 2B:
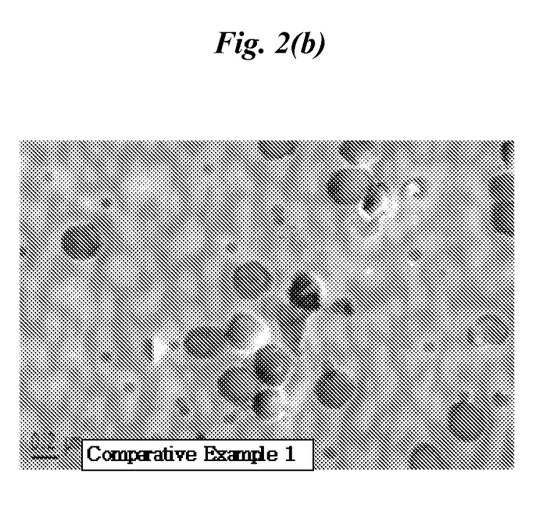
FIG. 2b is a TEM image representing phase behavior of comparative example 1.

Phase separation movement is confirmed through a Transmission Electron Microscope (TEM) image. FIG. 2(a) illustrates a TEM image of resin composition prepared by example 1 and FIG. 2(b) illustrates a TEM image of resin composition prepared by comparative example 1.

(2) Transparency: Total light transmittance (TT) is measured by a Haze meter NDH 2000 device by Nippon Denshoku. Total light transmittance is calculated by the quantity of light in total of diffusion light transmittance (DT) and parallel light transmittance (PT). The higher the total light transmittance (TT), the better the transparency is.

Also, the transparency is measured by the naked eye and classified as the follows.

⊚: transparent, ○: translucent, x: opaque (3) Impact strength: The noched izod impact strength of test specimens with a thickness of ⅛" is measured in accordance with ASTM D256.

(4) Melt flow index: Melt flow index (g/10 min) is measured at 250° C., 5 kg according to ASTM D1238.

(5) Scratch resistance: A BSP (Ball-type Scratch Profile) test is conducted by forming a scratch of a length of 10 to 20 mm on the resin sample at a load of 1,000 g and a scratch speed of 75 mm/min, using a metal spherical tip with a diameter of 0.7 mm and measuring a profile of the applied scratch using a surface profile analyzer (XP-1) having a metal stylus tip with a diameter of 2 μm. The scratch resistance is evaluated from the scratch width (μm) of the measured profile. As the measured scratch width decreases, the scratch resistance increases.

Figure 1A:
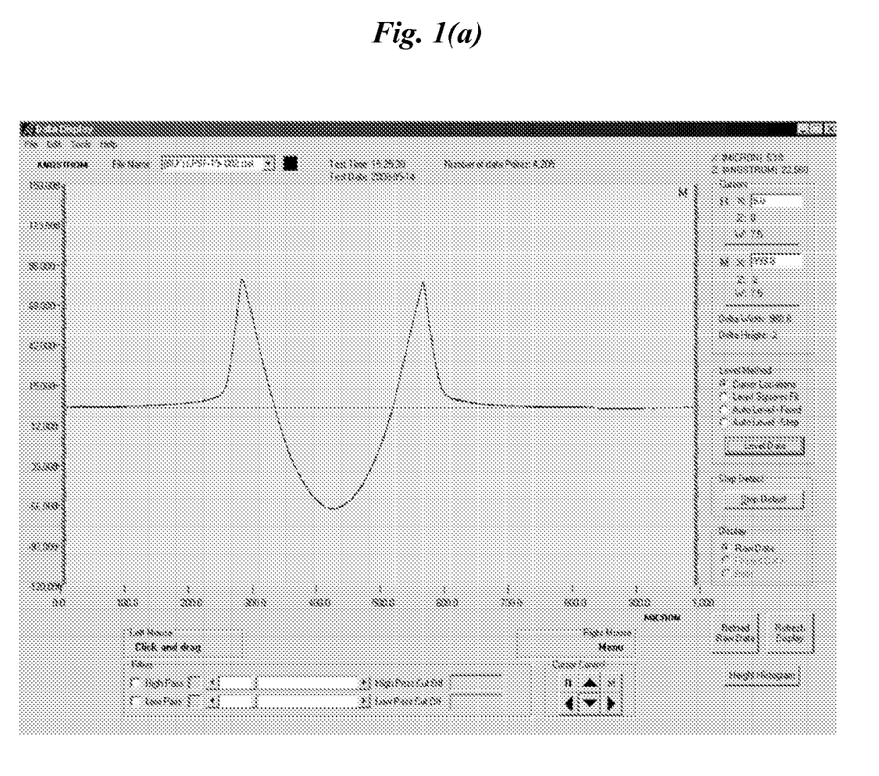
FIGS. 1(a) and 1(b) are scratch profiles measured by a Ball Scratch-type Profile (BSP) Test to compare scratch resistance of example 1 (FIG. 1(a)) with that of comparative example 6 (FIG. 1(b)).
Figure 1B:
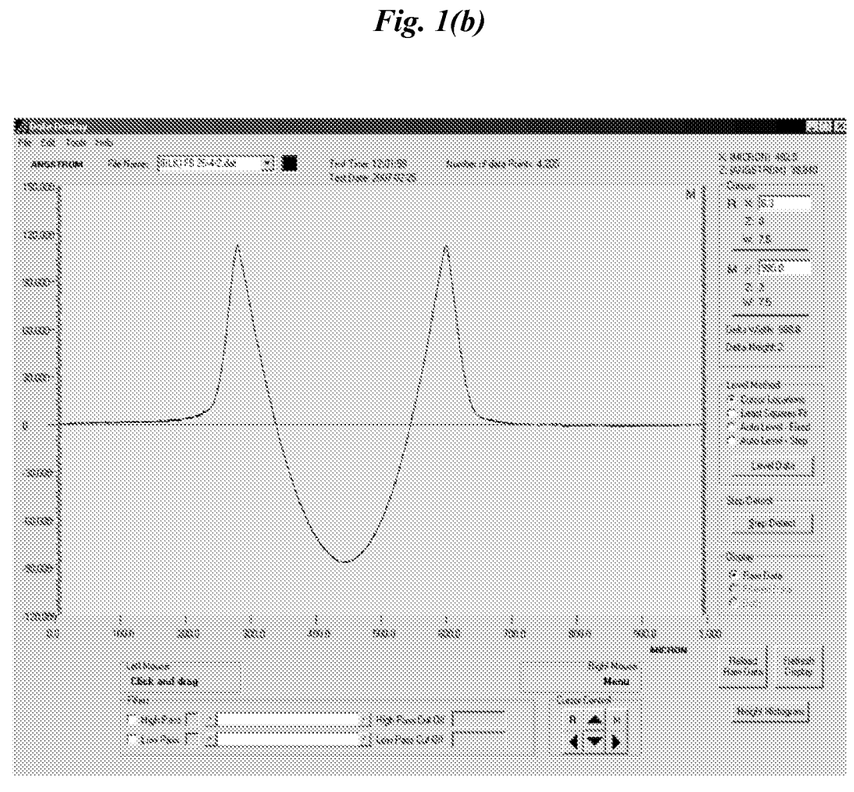

Measured scratch profile images of Example 1 and Comparative Example 6 are represented in FIG. 1(a) and FIG. 1(b), respectively.

(6) Complex viscosity: The complex viscosity is measured in accordance with Advanced Rheometric Expansion System (ARES) made by Rheometric Scientific Company at 240° C.

Figure 3:
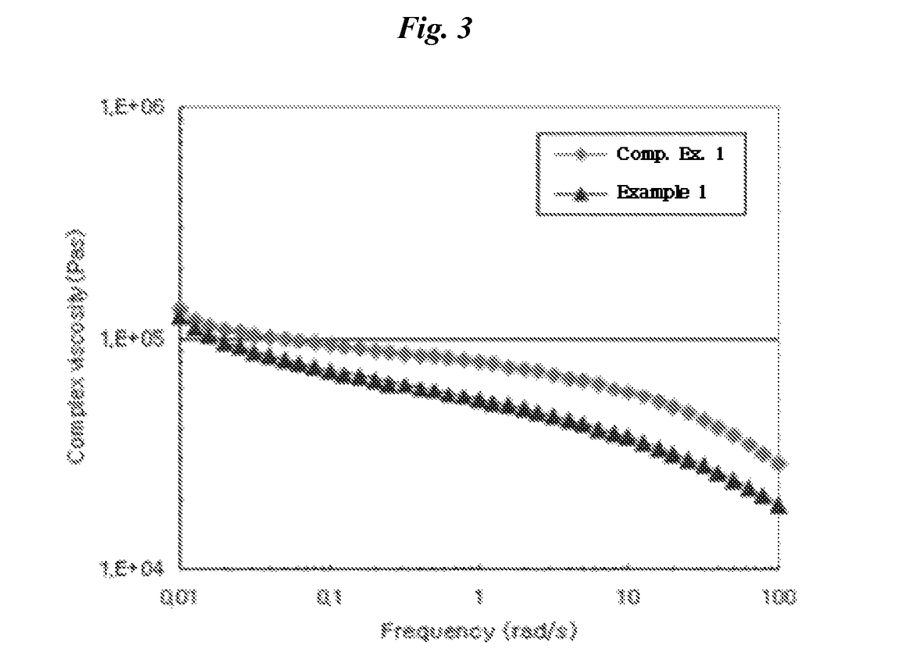
FIG. 3 is a graph representing viscosity behavior of example 1 and comparative example 1 measured by ARES.

FIG. 3 illustrates a complex viscosity behavior graph of the resin compositions of example 1 and comparative example 1.

acrylic monomers having a flexible segment and the refractive index of an ultra-high molecular weight branched acrylic copolymer resin.

Example 1 using a branched acrylic copolymer resin with higher weight average molecular weight shows better impact strength, compared to example 5.

When a mixture of (A) polycarbonate resin and (C-1) linear acrylic copolymer comprising acrylic monomers with high refractive index is used (comparative example 1), the compatibility and transparency of the resin composition are improved. However, the impact strength is deteriorated due to a brittle structure of the acrylic monomers.

When a mixture of (A) polycarbonate resin and (B-7) ultra-high molecular weight branched acrylic copolymer resin and without a flexible structure is used (comparative example 2),

TABLE 1

|  |  | Examples | | | | | | | Comparative Examples | | | | | |
|---|---|---|---|---|---|---|---|---|---|---|---|---|---|---|
|  |  | 1 | 2 | 3 | 4 | 5 | 6 | 7 | 1 | 2 | 3 | 4 | 5 | 6 |
|  | (A) | 70 | 70 | 70 | 70 | 70 | 70 | 70 | 70 | 70 | 70 | 70 | 70 | 100 |
| (B) | (B-1) | 30 | 15 |  |  |  |  |  |  |  |  |  |  |  |
|  | (B-2) |  |  | 30 |  |  |  |  |  |  |  |  |  |  |
|  | (B-3) |  |  |  | 30 |  |  |  |  |  |  |  |  |  |
|  | (B-4) |  |  |  |  | 30 |  |  |  |  |  |  |  |  |
|  | (B-5) |  |  |  |  |  | 30 |  |  |  |  |  |  |  |
|  | (B-6) |  |  |  |  |  |  | 30 |  |  |  |  |  |  |
|  | (B-7) |  |  |  |  |  |  |  |  | 30 |  |  |  |  |
|  | (B-8) |  |  |  |  |  |  |  |  |  | 15 | 30 |  |  |
| (C) | (C-1) |  | 15 |  |  |  |  |  | 30 |  | 15 |  |  |  |
|  | (C-2) |  |  |  |  |  |  |  |  |  |  |  | 30 |  |
|  | (D) | 8 | 8 | 8 | 8 | 8 | 8 | 8 | 8 | 8 | 8 | 8 | 8 |  |
| Flow Mark |  | X | X | X | X | X | X | X | X | X | O | O | O | X |
| Total light transmittance |  | 30.5 | 33.5 | 32.2 | 25.5 | 31.2 | 28.8 | 29.5 | 33.8 | 31.4 | 10.1 | 1.5 | 0.99 | 89.4 |
| Transparency |  | O | O | O | O | O | O | O | O | O | X | X | X | ⊚ |
| Impact Strength |  | 49.4 | 38.8 | 45.9 | 40.7 | 37.8 | 41.8 | 44.5 | 18.4 | 18.1 | 35.7 | 39.1 | 34.8 | 85.7 |
| Melt flow index |  | 8.11 | 7.24 | 6.76 | 7.33 | 9.25 | 7.65 | 7.98 | 5.73 | 6.72 | 6.33 | 5.52 | 5.08 | 4.81 |
| BSP |  | 289 | 286.9 | 287.2 | 288.8 | 289 | 289 | 290 | 287 | 290 | 290 | 291.3 | 289 | 340 |

As shown in Table 1, when a mixture of polycarbonate resin and acrylic resin is used (examples 1-7 and comparative examples 1-5), the scratch resistance of the resin composition is improved, compared to a composition including only the polycarbonate resin (comparative example 6).

As shown in FIG. 1, example 1 (FIG. 1(a)) shows good scratch resistance, compared to comparative example 6 (FIG. 1(b)).

When a mixture of (A) polycarbonate resin and (B-1 to B-6) ultra-high molecular weight branched acrylic copolymer resin according to the present invention is used, all of compatibility, transparency, impact strength, flowability and scratch resistance of the resin compositions are improved.

Example 2 using not only a (B-1) ultra-high molecular weight branched acrylic copolymer resin, but also a (C-1) linear acrylic copolymer shows good results with regard to the properties of the resin composition.

Example 1 using a certain amount or more of (meth)acrylic monomers having flexible segment shows better impact strength, compared to example 3. Example 4 using a branched acrylic copolymer resin with slightly lower refractive index shows a slightly reduced result in transparency.

Accordingly, the transparency and impact strength of resin compositions can be controlled by the amount of (meth) the compatibility and flowability of the resin composition are improved. However, the impact strength is deteriorated.

When a mixture of (A) polycarbonate resin, (B-8) ultra-high molecular weight branched acrylic copolymer resin with a low refractive index and (C-1) linear acrylic copolymer (comparative example 3) and a mixture of (A) polycarbonate resin and (B-8) ultra-high molecular weight branched acrylic copolymer resin with low refractive index (comparative example 4) are used, the impact strength of the resin composition is slightly improved. However, the compatibility is still deteriorated.

When a mixture of (A) polycarbonate resin and (C-2) polymethyl methacrylate is used (comparative example 5), the scratch resistance of the resin composition is improved. However, the compatibility and transparency are deteriorated.

Improved compatibility between polycarbonate resin and acrylic resin is confirmed through TEM image. As shown in FIG. 2, both the TEM images of example 1 and comparative example 1 show good compatibility between polycarbonate resin and acrylic resin. Specifically, both domains within FIG. 2(a) and FIG. 2(b) have a small size and a spherical shape. Accordingly, even when the (meth)acrylic monomers having a flexible segment is used (example 1), the compatibility is not deteriorated.

The improved compatibility also can be explained through the minimization of phase separation by viscosity difference. As shown in FIG. 3, when the frequency is increasing from 0.01 to 100 rad/s, the complex viscosity measured by ARES is decreasing. Also, this downward trend appears more sharply in the case of example 1, compared to comparative example 1. Accordingly, when the ultra-high molecular weight branched acrylic copolymer resin is used, the compatibility and flowability of the resin composition can be improved due to the decreased complex viscosity.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition comprising:
   (A) about 50 to about 99 parts by weight of a polycarbonate resin; and
   (B) about 1 to about 50 parts by weight of a ultra-high molecular weight branched acrylic copolymer resin,
   wherein (B) the ultra-high molecular weight branched acrylic copolymer resin comprises a polymer or a combination of polymers prepared by polymerizing a monomer mixture comprising (b1) an aromatic methacrylate monomer, an alicyclic methacrylate monomer, or a combination thereof, (b2) a monomer copolymerizable with the aromatic methacrylate monomer, the alicyclic methacrylate monomer, or the combination thereof comprising methyl methacrylate, ethyl methacrylate, propyl methacrylate, methyl acrylate, ethyl acrylate, propyl acrylate, 2-hydroxyethyl acrylate, 2-hydroxypropyl acrylate, monoglycerol acrylate, acrylic acid, methacrylic acid, maleic anhydride, or a combination thereof, (b3) a (meth)acrylic monomer having a flexible segment, and (b4) a monomer forming a branched structure; wherein (b3) the (meth)acrylic monomer having a flexible segment comprises a compound represented by the following Chemical Formula 5 or a combination thereof:

[Chemical Formula 5]

wherein m is an integer from 10 to 18, X is hydrocarbon, and Y is methyl or hydrogen.

2. The polycarbonate resin composition of claim 1, further comprising (C) about 0 to about 50 parts by weight of a linear acrylic resin.

3. The polycarbonate resin composition of claim 1, wherein (B) the ultra-high molecular weight branched acrylic copolymer resin comprises a polymer or a combination of polymers prepared by polymerizing a monomer mixture comprising (b1) about 5 to about 99.8% by weight of an aromatic methacrylate monomer, an alicyclic methacrylate monomer, or a combination thereof, (b2) greater than 0 to about 94.5% by weight of the monomer copolymerizable with the aromatic methacrylate monomer, the alicyclic methacrylate monomer, or the combination thereof, (b3) about 0.1 to about 40% by weight of a (meth)acrylic monomer having a flexible segment, and (b4) about 0.001 to about 10% by weight of a monomer forming a branched structure.

4. The polycarbonate resin composition of claim 1, wherein (B) the ultra-high molecular weight branched acrylic copolymer resin has a weight average molecular weight of about 100,000 to about 5,000,000.

5. The polycarbonate resin composition of claim 1, wherein (B) the ultra-high molecular weight branched acrylic copolymer resin has a refractive index of about 1.495 to about 1.570.

6. The polycarbonate resin composition of claim 1, wherein (b1) the aromatic methacrylate monomer, the alicyclic methacrylate monomer, or combination thereof and (b2) the monomer copolymerizable with the aromatic methacrylate monomer, the alicyclic methacrylate monomer, or the combination thereof each have a refractive index of about 1.495 to about 1.570.

7. The polycarbonate resin composition of claim 1, wherein (b1) the aromatic methacrylate monomer, the alicyclic methacrylate monomer, or combination thereof are represented by the following Chemical Formula 2, Chemical Formula 3, or a combination thereof:

[Chemical Formula 2]

wherein m is an integer from 0 to 10 and X is cyclohexyl, phenyl, methylphenyl, methylethylphenyl, methoxyphenyl, cyclohexylphenyl, chlorophenyl, bromophenyl, phenylphenyl or benzylphenyl;

[Chemical Formula 3]

wherein m is an integer from 0 to 10, Y is oxygen (O) or sulfur (S), and Ar is cyclohexyl, phenyl, methylphenyl, methylethylphenyl, methoxyphenyl, cyclohexylphenyl, chlorophenyl, bromophenyl, phenylphenyl or benzylphenyl.

8. The polycarbonate resin composition of claim 1, wherein (b1) the aromatic methacrylate monomer, the alicyclic methacrylate monomer, or combination thereof comprises cyclohexyl methacrylate, phenoxy methacrylate, phenoxy ethyl methacrylate, 2-ethylphenoxy methacrylate, 2-ethylthiophenyl methacrylate, 2-ethylaminophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, or a combination thereof.

9. The polycarbonate resin composition of claim 1, wherein (b3) the (meth)acrylic monomer having a flexible segment comprises both a compound represented by the following Chemical Formula 4 and a compound represented by the following Chemical Formula 5:

[Chemical Formula 4]

wherein m is an integer from 3 to 9, X is hydrocarbon, and Y is methyl or hydrogen;

[Chemical Formula 5]

wherein m is an integer from 10 to 18, X is hydrocarbon, and Y is methyl or hydrogen.

10. The polycarbonate resin composition of claim 1, wherein (b3) the (meth)acrylic monomer having a flexible segment comprises stearyl (meth)acrylate, lauryl (meth)acrylate, or a combination thereof.

11. The polycarbonate resin composition of claim 1, wherein (b4) the monomer forming a branched structure comprises a silane compound; a siloxane compound; an allyl compound; a (poly)alkylene glycol di(meth)acrylate compound; an aromatic monomer; a vinyl group-containing monomer; pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, glycerol tri(meth)acrylate; or a combination thereof.

12. The polycarbonate resin composition of claim 11, wherein the silane or siloxane compound includes an unsaturated hydrocarbon group-containing silicone-containing monomer; the allyl compound includes diallyl phthalate, diallylacrylamide, triallyl (iso)cyanurate, triallyl trimelitate, or a combination thereof; the(poly)alkylene glycol di(meth) acrylate compound includes 1,6-hexanediol di(meth)acrylate, (poly)ethylene glycol di(meth)acrylate, (poly)propylene glycol di(meth)acrylate, (poly)tetramethylene glycol di(meth)acrylate, or a combination thereof; the aromatic monomer includes divinylbenzene; and the vinyl group-containing monomer includes 1,4-divinyloxybutane, divinylsulfone, or a combination thereof.

13. The polycarbonate resin composition of claim 2, wherein (C) the linear acrylic resin has a weight average molecular weight of about 5,000 to about 300,000.

14. The polycarbonate resin composition of claim 2, wherein (C) the linear acrylic resin is a homopolymer prepared using one kind of (meth)acrylic monomer, a copolymer prepared using two or more kinds of (meth)acrylic monomers, or a combination thereof, and (C) the linear acrylic resin has a linear structure.

15. The polycarbonate resin composition of claim 14, wherein the (meth)acrylic monomer comprises methyl methacrylate, ethyl methacrylate, n-propyl methacrylate, n-butyl methacrylate, phenyl methacrylate, benzyl methacryate, hexyl methacrylate, cyclohexyl methacrylate, phenoxy methacrylate, phenoxyethyl methacrylate, methyl acrylate, ethyl acrylate, propyl acrylate, butyl acrylate, 2-ethylhexyl acrylate, 2-ethylhexyl methacrylate, or a combination thereof.

16. The polycarbonate resin composition of claim 1, wherein the polycarbonate resin composition has a complex viscosity ($\eta^*$) of about 10,000 to about 1,000,000 Pa s at 240° C. under the frequency of 0.01 rad/s, and a ratio of $\eta^*$ (0.01 rad/s)/$\eta^*$ (100 rad/s) within the range of about 2.0 to about 10.0 at 240° C.

17. The polycarbonate resin composition of claim 1, further comprising one or more additives selected from the group consisting of antibacterial agents, mold release agents, heat stabilizers, antioxidants, light stabilizers, compatibilizers, dyes, inorganic additives, surfactants, nucleating agents, coupling agents, fillers, plasticizers, reinforcers, admixing agents, coloring agents, stabilizers, lubricants, antistatic agents, pigments, flame retardants, and combinations thereof.

18. A molded article prepared from the polycarbonate resin composition of claim 1.

* * * * *